Nov. 1, 1932.  G. W. McKEE  1,885,851
REGULATOR
Filed Sept. 10, 1928
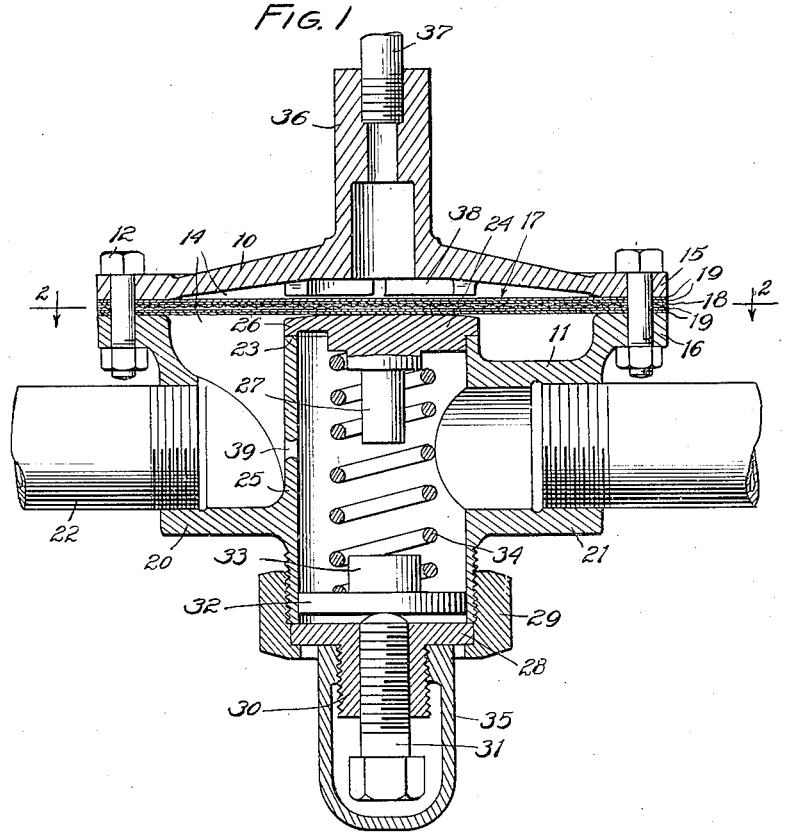
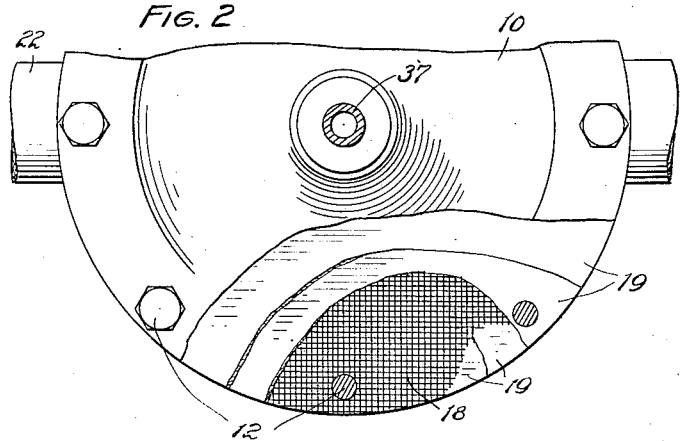
Inventor
Garnet W. McKee
By Chindall Parker Carlson
Attys Patented Nov. 1, 1932

1,885,851

UNITED STATES PATENT OFFICE

GARNET W. McKEE, OF ROCKFORD, ILLINOIS

REGULATOR

Application filed September 10, 1928. Serial No. 304,986.

The present invention relates to improvements in fluid regulators, and particularly gas regulators in which the flow of gas is controlled in accordance with an outside pressure.

In certain regulators of this type, the flow of fluid therethrough is controlled by a valve movable with a flexible diaphragm. Of the diaphragm, one side is subject to the pressure of a spring, and the other side is exposed to an outside pressure. Where a single layer diaphragm is provided rupture of the diaphragm will permit the outside pressure fluid and the gas to intermingle.

The primary object of the present invention resides in the provision of a novel reinforced diaphragm.

Another object resides in the provision of a plural-layer diaphragm having an intermediate layer permeable to fluids and extending to the exterior of the diaphragm casing.

A more specific object resides in the provision of a novel diaphragm comprising an intermediate mesh or screen layer and one or more fluid-tight layers at each side thereof, the mesh layer serving to vent any fluid passing through the layers at either side to the outside of the diaphragm casing.

Further objects and advantages will become apparent as the description proceeds.

In the accompanying drawing, Figure 1 is a sectional view of a regulator embodying the features of my invention.

Fig. 2 is a fragmentary plan view partially in section along line 2—2 of Figure 1.

While the invention is susceptible of various modifications and alternative constructions, I have shown in the drawing, and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the exemplary embodiment of the invention, the regulator comprises two hollow casing members 10 and 11 secured together in opposed relation by any suitable means, such as bolts 12, and defining a diaphragm chamber 14. The casing members 10 and 11 may be of any suitable form, and in the present instance are generally circular in shape having peripheral flanges 15 and 16 through which the bolts 12 extend.

Disposed between the casing members 10 and 11 is a flexible diaphragm 17 comprising an intermediate layer 18 and one or more outer layers 19 at each side thereof. The intermediate layer is pervious to fluids, and preferably is made of screen mesh. The outer layer 19 may be made of any suitable material, such as leather or flexible metal. The layers 18 and 19 are arranged in superimposed relation, and the peripheral edges are clamped together between the flanges 15 and 16.

The casing member 11 is formed with an inlet fitting 20 and an outlet fitting 21 adapted to be connected in a fluid line 22, and also with a suitable valve seat 23 in the fluid line. A valve member 24 is adapted to coact with the valve seat 23 to regulate the flow of fluid through the line 22. While these parts may be of any suitable form, preferably the seat 23 is defined by the free inner edge of a cylindrical sleeve 25 formed integrally with the casing member 11, and the valve member 24 comprises a plate adapted to slide in the free end of a sleeve 25 and having a peripheral flange 26 adapted to coact with the seat 23. The fitting 20 opens directly into the sleeve 25. The valve member 24 is arranged in abutting engagement with one side of the diaphragm, and is formed with a guide pin 27 extending into the sleeve 25.

Repeated flexure of the diaphragm over a sharp edge would tend to cause cracking or rupturing. To prevent this, the inner edges of the flanges 15 and 16 are rounded, and the upper surface of the valve member 24 is convex so as to conform substantially to the curvature of the diaphragm when the latter is flexed upwardly.

The outer end of the sleeve 25 is closed by a plate 28 secured in place by a gland nut 29, and having an outer central boss 30 threaded externally and internally. Extending through the boss 30 is an adjusting screw 31. A spring seat or rest 32 is slidably disposed in the outer end of the sleeve 25, and is adapted to engage the inner end of the screw 31. The seat 32 is formed with an inwardly extending guide pin 33. Disposed between the valve member 24 and the seat 32 is a coil spring 34, the ends of which are held in place by the pins 27 and 33. A suitable closed cap 35 is threaded over the boss 30 to enclose the screw 31. The spring 34 tends to urge the valve member 24 away from the seat 23 toward the diaphragm 17, and may be adjusted by means of the screw 31.

The casing member 10 is formed with a central fitting 36 adapted to be connected to a pipe 37 leading to a source of external pressure fluid (not shown) in accordance with which the passage of fluid through the line 22 is to be controlled. Obviously, the pressure fluid will urge the diaphragm 17 against the valve 24, thus tending to close the latter against the force of the spring 34. The outside pressure fluid and the pressure of the spring 34 are such that they will establish the desired equilibrium to permit the proper amount of flow through the line 22. Segmental lugs 38 are formed in the member 10 to limit the outward movement of the diaphragm 17.

A bleed port 39 is formed in the wall of the sleeve 25 to permit the flow of a small amount of fluid in the line 22 when the valve member 24 engages the seat 23.

It will be evident that I have provided a simple, inexpensive and efficient regulator. All of the parts are readily accessible. Should the layers 19 at either side of the intermediate layer 18 become permeable to the passage of fluids, the fluid passing therethrough will be vented from the casing by filtration through the interstices of the intermediate layer. This venting will prevent a complete rupture of the diaphragm, and intermingling of the fluid in the line 22 and the outside pressure fluid. The intermediate layer 18 also serves to strengthen and reinforce the diaphragm.

I claim as my invention:

1. A regulator comprising, in combination, a casing formed of two sections, a diaphragm secured between said sections, said diaphragm comprising a plurality of superimposed layers including an intermediate screen layer with open interstices, means for admitting pressure fluid to one section of said casing, a fluid line including said other section of said casing, and valve means in said other section for controlling the flow of fluid through said line, said valve means being responsive to the movements of said diaphragm, said diaphragm having the intermediate layer in free communication with the exterior of the casing so that upon a rupture of a layer on either side of the intermediate layer the fluid admitted through the rupture will vent to atmosphere.

2. A regulator comprising, in combination, a casing, a laminated diaphragm in said casing, said diaphragm comprising an intermediate layer pervious to fluids and an impervious layer at each side thereof and separate therefrom, means for mounting said diaphragm in the casing with the pervious intermediate layer in communication with the exterior of the casing so that fluid permeating said layer can vent to atmosphere, valve means in said casing at one side of said diaphragm, said valve means being responsive to the movements of said diaphragm, means for admitting pressure fluid to said casing at the other side of said diaphragm, and means for resisting the action of said pressure fluid on said diaphragm and said valve.

3. A regulator comprising, in combination, a casing, a laminated diaphragm in said casing, said diaphragm comprising a plurality of superimposed separable layers of which an intermediate layer is permeable to fluid, said diaphragm being mounted in the casing with the intermediate layer venting to the exterior of the casing, valve means at one side of said diaphragm, said valve means being responsive to the movements of said diaphragm, and means for admitting pressure fluid to said casing at the other side of said diaphragm.

4. A regulator comprising, in combination, a casing comprising a pair of separable members, a diaphragm in said casing between said members, means for clamping the peripheries of said members and said diaphragm together with the diaphragm being exposed to the exterior of said casing, said diaphragm comprising an intermediate layer of screen with open interstices and two impervious outside layers, one positioned loosely against each side of said intermediate layer so that fluid may flow through the open interstices to the exterior of the casing, valve means responsive to the movements of said diaphragm, means for admitting pressure fluid to said casing at one side of said diaphragm, and means for resisting the action of said pressure fluid on said diaphragm.

5. A regulator comprising, in combination, a casing comprising a pair of separable members having peripheral flanges, a diaphragm in said casing between said members, means for clamping the peripheral margin of said diaphragm between said flanges with the peripheral edge of said diaphragm exposed to the exterior of said casing, said diaphragm comprising an intermediate layer of screen with open interstices through which fluid may flow to the exterior of the casing, and two impervious outer layers one positioned against each side of said intermediate layer, said layers being unattached to each other over the entire area circumscribed by said flanges, valve means responsive to the movements of said diaphragm, means for admitting pressure fluid to said casing at one side of said diaphragm and means for resisting the action of said fluid on said diaphragm.

6. In a diaphragm for a fluid regulator, the combination of a plurality of layers of material impervious to fluid, and an intermediate layer of material pervious to fluid, said layers being separate so that upon rupture of the impervious layers on either side of the pervious layer the fluid entering through the rupture will escape to the periphery of the diaphragm through the pervious layer, thereby to prevent rupture of the remaining impervious layers.

In testimony whereof, I have hereunto affixed my signature.

GARNET W. McKEE.